(12) United States Patent
Aubert et al.

(10) Patent No.: US 6,776,454 B1
(45) Date of Patent: Aug. 17, 2004

(54) SEAT

(75) Inventors: Thierry Aubert, Zürich (CH); Philipp Angst, Zug (CH); Michael Rickli, Thun (CH)

(73) Assignee: Girsberger Holding AG, Butzberg (CH)

( * ) Notice: Subject to any disclaimer, the term of this patent is extended or adjusted under 35 U.S.C. 154(b) by 67 days.

(21) Appl. No.: 10/111,047

(22) PCT Filed: Sep. 21, 2000

(86) PCT No.: PCT/EP00/09234
§ 371 (c)(1),
(2), (4) Date: Apr. 19, 2002

(87) PCT Pub. No.: WO01/30203
PCT Pub. Date: May 3, 2001

(30) Foreign Application Priority Data

Oct. 26, 1999 (DE) .......................................... 199 51 625

(51) Int. Cl.[7] .................................................. B60N 2/42
(52) U.S. Cl. .................................. 297/216.19; 297/322
(58) Field of Search .......................... 297/216.1, 216.13, 297/216.14, 216.15, 216.16, 216.17, 216.18, 219.19, 216.2, 320, 322, 316, 317, 325, 216.19

(56) References Cited

U.S. PATENT DOCUMENTS

| | | | |
|---|---|---|---|
| 3,572,829 A | | 3/1971 | Malitte |
| 4,456,297 A | * | 6/1984 | Pietschmann et al. ...... 297/316 |
| 4,684,173 A | * | 8/1987 | Locher ....................... 297/300 |
| 4,703,974 A | * | 11/1987 | Brauning |
| 5,058,954 A | | 10/1991 | Kan-Chee |
| 5,244,252 A | * | 9/1993 | Serber .................... 297/216.19 |
| 5,437,494 A | * | 8/1995 | Beauvais ............... 297/216.19 |
| 5,558,399 A | * | 9/1996 | Serber ....................... 297/284.4 |
| 5,735,574 A | * | 4/1998 | Serber ....................... 297/284.4 |
| 5,810,440 A | * | 9/1998 | Unwalla ..................... 297/316 |
| 6,334,648 B1 | | 1/2002 | Girsberger et al. |
| 6,578,917 B1 | * | 6/2003 | Aubert et al. ............... 297/317 |

FOREIGN PATENT DOCUMENTS

| | | |
|---|---|---|
| DE | 3822877 A | 1/1990 |
| DE | 19853156.7 | 11/1998 |
| FR | 2621795 | 4/1989 |

* cited by examiner

Primary Examiner—Peter M. Cuomo
Assistant Examiner—Stephen Vu
(74) Attorney, Agent, or Firm—Volpe and Koenig, P.C.

(57) ABSTRACT

The invention concerns a seat (1) with a seat support (2) which has a seating surface (3) as well as a backrest (4) connected pivotable with it, which seating surface (3) and backrest (4) are mounted adjustably and fixably on a seat bracket (7) for adjusting the position of the seat support (2). For the seat (1) of the invention, it is characteristic that back inclination of the backrest (4) is adjustable in connection with a fixed seating angle (α) between backrest (4) and seating surface (3) by pivoting the seat support (2) relative to the seat bracket (7), and that the seating angle of the seating surface (3) is adjustable in connection with a pivotal point (9) fixed in the longitudinal direction of the seat by pivoting the seating surface (3) relative to the backrest (4). The seat (1) of the invention is distinguished by a comparatively short adjustment pathway through a large back inclination adjustment of the backrest (4).

5 Claims, 1 Drawing Sheet

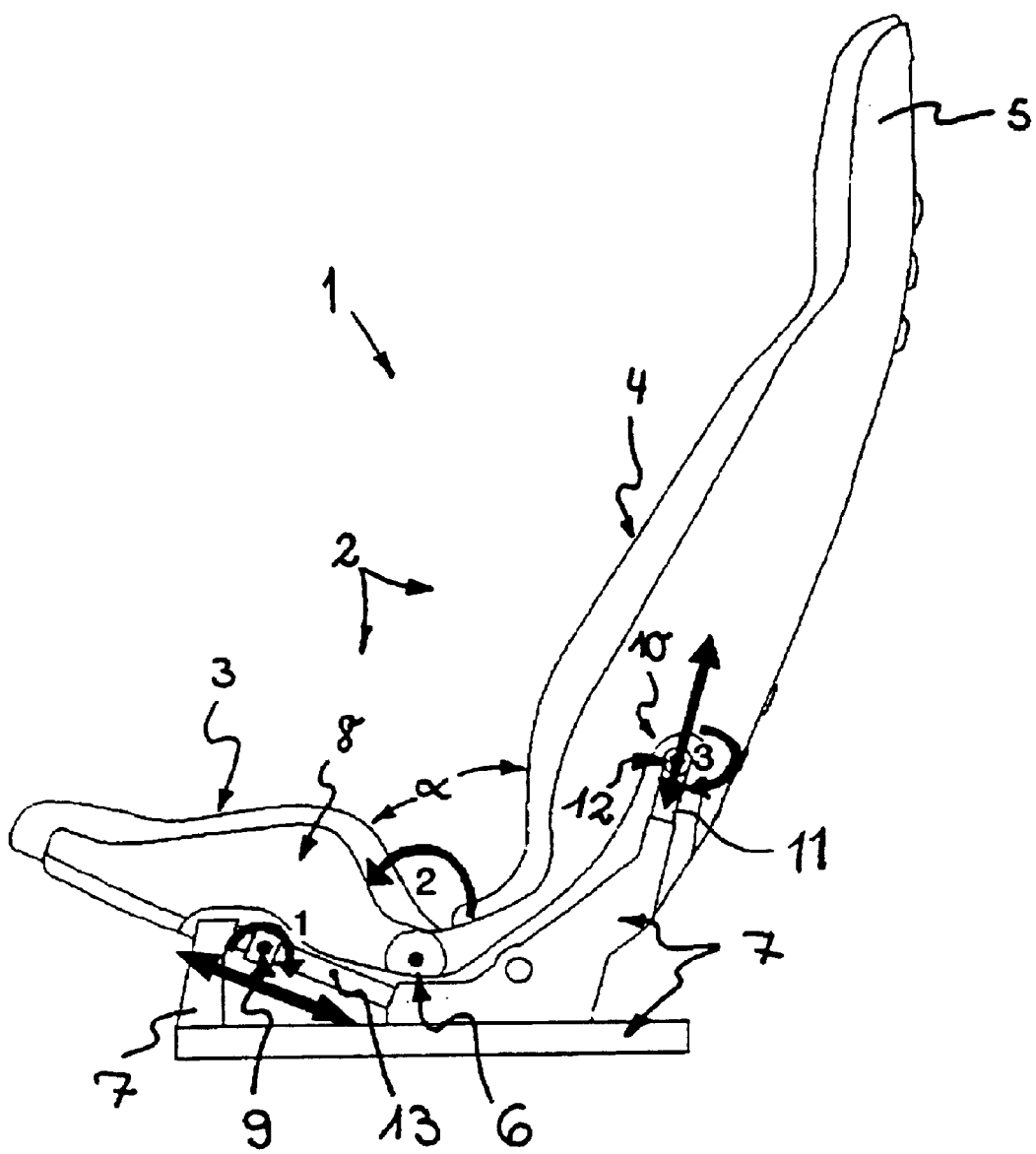

SEAT

BACKGROUND

The invention concerns a seat with a seat support which has a seating surface as well as a backrest pivotably joined with it, which seating surface and backrest are movably and fixably held for rotatable and longitudinal movement in a seat support, whereby the back inclination of the backrest is adjustable with a fixed seating angle between the backrest and the seating surface through pivoting the seat support relative to the seat bracket, and whereby the seat inclination of the seating surface is adjustable about a pivot point of the seating surface that is fixed in a seat longitudinal direction on the seat bracket by pivoting the seat surface relative to the backrest.

Seats, in which the seating surface as well as the pivotably connected backrest which are movably and fixably held on a seat bracket for position adjustment are known, for example as office chairs or also as automobile seats in the most varied constructions.

Thus, for example in the back seat area, automobile seats with a so called drag support are used. With these previously known automobile seats, the seating surface can be moved forward using a motor servo drive. Since the seating surface is connected through a swivel joint with the back rest, the seating part pulls the back rest along which is slidably guided in a positively driven operation in the upper part of the rest.

The seat inclination of this previously known seat can be adjusted through a circular segment which can raise and depress the seating surface separately in a front free seat area of the seating surface by means of a further servo drive. Since in this previously known seat, the back inclination can only altered indirectly though a longitudinal motion of the seating surface, a comparatively longer adjusting motion is necessary for a greater change.

From DE 38 22 877 A1, a seat in accordance with the known Art, which is used as an airplane seat is provided. In order to alter the inclined position of the backrest in the seating area without encroaching upon the airplane passenger seated behind, the seat shell and backrest are at simultaneously slid in coulisse type glide guides. As the seat shell and the backrest are pivotably connected with each other, the seat position can be arrived at, in which the seating surface is maintained in its horizontal position and slides forward as the backrest is greatly inclined, without interfering with other passengers.

A further scat construction, in which the seat surface and its pivotably connected backrest are movably and fixably held, is known to the applicant from EP 0 865 960 A1. In this seat construction, which is used as an automobile seat, the backrest is moved through a crash induced force on the user of a seat from a given starting position into a safety position. For this, the carrier part has a support for the scat back arranged above the sitting surface and spaced with an effective lever arm from the position for the introduction of forces by the pelvis area against the seat back. The seat part is connected to a guide slanting upwardly and forwardly away from the seat back, so that during a frontal collision, the seat part is moved from the originally selected starting position into a position of greater safety.

From these known seats, the positionability between the seating surface and the backrest is set on the grounds of maintaining a limited area or for vehicle safety, where the seat and operator comfort of the user is not the primary focus of these seat constructions.

SUMMARY

There therefore in particular exists the object of creating a seat of the above-mentioned type, which has a comparatively large adjustment range in order to provide the user with the greatest possible seat and operating comfort.

The accomplishment of this object in accordance of the invention is provided with a scat of the type mentioned at the beginning, in that for seat inclination positioning a drag link with an integrated drive arrangement is provided between the seating surface and the backrest.

In a further aspect of the invention, for seat inclination positioning, the backrest is connected to the seat bracket through a linear drive arrangement, that is constructed as a lifting drive and engages with its end region on the pivot point of the backrest in its restricted guide path.

In accordance with the inventive seat, a manual positioning of the seat inclination position is possible. Alternatively, a drive arrangement is provided, with which seat inclination position as well as seat position can be adjusted.

The adjustment of the seat and backrest inclination does not take place though the traditional direct adjustment of backrest and the seating surface, but rather the seating angle can be set by the proper adjustment the seating angle formed by the seating surface and the backrest by sliding the seating surface in the longitudinal direction of the seat and pivoting the seat support relative to the seat bracket to an individually desired extent. In comparison with, for example, previously known automobile seats, for example, with the seat of the invention, with an equal adjustment path, an essentially larger back inclination can be attained.

Here the seat of the invention can be constructed as an office chair or similar seating furniture or as an automobile seat, airplane seat or similar vehicle seat.

The seating surface and the backrest are in each case held rotatably and longitudinally slidable in restricted guides on the seat bracket. The seating surface and the backrest can for this be held through pivotable slide guides on the seat bracket. These pivotable slide guides permit in connection with a back inclination adjustment a simultaneous moving and rotation of the seating surface and the backrest. In connection with a seat inclination adjustment, the restricted guides allocated to the seating surface merely acts as a rotary joint, while the backrest, connected with the seating surface through a pivot joint, travels with its pivotable slide guide and can be rotated in relation to the seat bracket.

Consequently, the backrest can travel with its pivot point fixed in the longitudinal direction on the seat bracket as a consequence of a change in the seating angle along the positively driven operation allocated to the backrest, and in this way bring about a change in seat inclination. If in contrast, the seating angle formed between seating surface and backrest is fixed and the pivot point of the seating surface is moved in its positively driven operation, the backrest follows in its positively driven operation and inclines about its own pivot point in the positively driven operation of the backrest such that the entire seat support is pivoted relative to the seat bracket.

A preferred embodiment provides at least one drive arrangement for the backrest inclination positioning and the seat inclination positioniong.

The seat of the invention can be configured as an office chair or similar seating furniture without further ado. An embodiment in which the seat is constructed as an automobile seat or aircraft seat is preferred. A seat, constructed for example as an automobile seat, can be configured as a front or rear seat.

BRIEF DESCRIPTION OF THE DRAWING(S)

Further features of the invention will become apparent on the basis of the following description of an embodiment of the invention in connection with the claims as well as the drawing.

DETAILED DESCRIPTION OF THE PREFERRED EMBODIMENT(S)

An automobile seat 1 is represented in the sole FIGURE, which here is constructed as a driver or front passenger seat.

The seat 1 has a seat support 2 which has a seating surface 3 and a backrest 4 with integral head rest 5. The seating surface 3 and the backrest 4, which in any given case can also have several segments, are pivoted with one another on their sides facing each other through a freely arranged swivel joint 6. To adjust the seat support 2, the seating surface 3 and the backrest 4 are adjustable on a seat bracket 7 and held fixably. This seat bracket 7 is here constructed as a frame and arranged on both sides of the seat support 2.

As is recognizable in the sole FIGURE, the seating surface 3 and the backrest 4 are in each case held rotable and movable in the longitudinal direction of the seat. The seating surface 3 and the backrest 4 are for this connected over tangential force guides 8, 10 with the seat bracket 7.

The back inclination of the backrest 4 is adjustable in connection with the seating angle α set between backrest 4 and seating surface solely by pivoting the seat support 2 relative to the seat bracket 7. In connection with this, the seating surface 3 and the backrest 4 of the seat support 2 travel in their restricted guides 8, 10 in the longitudinal direction of the seat without the seating angle α being changed. The scat inclination of seating surface 3 can be adjusted when the pivotal point 9 of the seating surface is fixed in the longitudinal direction of the seat on the seat bracket 7 by pivoting the seating surface 3 relative to the backrest 4. Here with seat 1, even with a comparatively short adjustment pathway, a large back inclination change can be obtained.

While the backrest 4 is slid for this in its restricted guide 10, the seating surface 3 rotates while changing the seating angle α formed between seating surface 3 and backrest 4 about its pivotal point 9 fixed in the longitudinal direction of the seat on the seat bracket 7.

The seat inclination adjustment can take place though a servo drive which is incorporated into the swivel joint 6 between seating surface 3 and backrest 4. With the seat 1 represented here, the seat inclination adjustment is nevertheless constructed by a linear servo drive which is constructed as a lifting drive 11 and at the same time serves as a restricted guide. This servo drive held here in the seat bracket 7 engages with its end region on the pivotal point 12 of the backrest 4 and consequently forms, independently of its stroke position, in any given case the highest subregion of the seat bracket 7 opposite the floor or similar base.

For adjustment of the back inclination, in contrast a rack and pinion drive is provided, whose here basically round gear rack 13 at the same time serves as a restrictive guide for the seating surface 3 lying above it.

The seat 1 is configured as a free-standing driver or front passenger seat whose scat bracket 7 is connected fast with the vehicle floor. The seat 1 can, however, also for example be constructed as a back seat. With such a seat constructed as a vehicular back seat, a region of the vehicle back wall can, for example, serve as seat bracket which is connected with the linear servo drive or restrictive guide for the backrest.

The seat represented here can be combined without further ado with an automatic seat adjustment as it is described in the still unpublished patent application DE 198 53 156.7 of the applicant. This automatic seat adjustment allows the body-synchronous adjustment of the servo drive through at least one body position reporting device.

What is claimed is:

1. A seat comprising a seat support (2), having a seating surface (3) pivotably connecting to backrest (4) said seating surface (3) and said backrest (4) are each, pivotably adjustable and lengthwise slidable in a restricted guide on a seat bracket (7), and fixable in position, a back inclination of the backrest (4) is adjustable in connection with a fixed seating angle (α) between the backrest (4) and the seating surface (3) by pivoting the seat support (2) relative to the seat bracket (7), and wherein a seat inclination of the seating surface (3) is adjustable in connection with a pivotal point (9) of the seating surface (3) fixed in the longitudinal direction of the seat on the seat bracket (7) by pivoting the seating surface (3) relative to the backrest (4), wherein for adjusting the seat inclination a drag link with an integrated drive arrangement is provided between the seat surface (3) and the backrest (4), wherein the inclination of the backrest (4) is adjustable independently of the inclination of the seat surface (3) through translation of the pivotal point (9).

2. The seat according to claim 1, wherein the backrest (4) is connected to a drive arrangement, including a linearly restricted drive, at a pivot point (12) on the backrest, for adjusting the seat inclination.

3. The seat according to claim 1, wherein a separate drive arrangement is provided for adjusting the back inclination.

4. The seat according to claim 1, wherein the seat (1) comprises at least one of an automobile seat and an aircraft seat.

5. The seat according to claim 1, wherein the seat (1) comprises at least one of a front seat and a back seat.

* * * * *